US009681290B2

(12) United States Patent
Kelley

(10) Patent No.: US 9,681,290 B2
(45) Date of Patent: Jun. 13, 2017

(54) DUMMY PHONE NUMBERS TO MANAGE STATES ON MOBILE PHONES

(71) Applicant: Microsoft Corporation, Redmond, WA (US)

(72) Inventor: Jeffrey Kelley, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 14/025,552

(22) Filed: Sep. 12, 2013

(65) Prior Publication Data
US 2015/0072670 A1 Mar. 12, 2015

(51) Int. Cl.
*H04W 88/06* (2009.01)
*H04W 8/18* (2009.01)
*H04M 1/2745* (2006.01)
*H04M 1/725* (2006.01)

(52) U.S. Cl.
CPC ..... *H04W 8/183* (2013.01); *H04M 1/274516* (2013.01); *H04M 1/7253* (2013.01)

(58) Field of Classification Search
CPC ....... H04W 8/18; H04W 8/183; H04W 88/06; H04M 1/6066; H04M 1/6091
USPC .......................................... 455/569.1–569.2
See application file for complete search history.

(56) References Cited

U.S. PATENT DOCUMENTS

| 2009/0011799 | A1* | 1/2009 | Douthitt | H04M 1/6091 455/569.1 |
|---|---|---|---|---|
| 2009/0215491 | A1 | 8/2009 | Hou et al. | |
| 2012/0135715 | A1* | 5/2012 | Kang | H04W 8/183 455/412.1 |

(Continued)

FOREIGN PATENT DOCUMENTS

| CN | 101360292 A | 2/2009 |
|---|---|---|
| CN | 101472355 A | 7/2009 |

(Continued)

OTHER PUBLICATIONS

"Sony Xperia E Dual Review: Something Extra", Published on: Feb. 11, 2013, Available at: <http://www.gsmarena.com/sony_xperia_e_dual-review-882p6.php>, 4 pages.

(Continued)

*Primary Examiner* — Lester Kincaid
*Assistant Examiner* — William Wang
(74) *Attorney, Agent, or Firm* — Fiala & Weaver P.L.L.C.

(57) ABSTRACT

A user is enabled to change state on a mobile phone through a peripheral device, such as a vehicle or headset. The mobile phone is coupled with the peripheral device by a communication link. Contacts stored by the mobile phone are copied to the peripheral device. The contacts include contact names and corresponding dummy phone numbers. Each contact name and corresponding dummy phone number is associated with a corresponding mobile phone state. A user can interact with the peripheral device to select a contact name of the contacts as if initiating a phone call with the corresponding dummy phone number to cause the corresponding mobile phone state to be activated at the mobile phone. Examples of mobile phone state activations/changes include activating an application in the mobile phone, or activating a particular SIM (subscriber identity module) of multiple SIMs of the mobile phone.

20 Claims, 6 Drawing Sheets

(56) References Cited

U.S. PATENT DOCUMENTS

2013/0023255 A1    1/2013    Yang et al.
2014/0237570 A1*   8/2014    Shishkov .............. G06F 21/316
                                                                                     726/7

FOREIGN PATENT DOCUMENTS

| EP | 2093982 A1 | 8/2009 |
| WO | 2006074345 A1 | 7/2006 |
| WO | 2007012881 A1 | 2/2007 |
| WO | 2012163436 A1 | 12/2012 |
| WO | 2013017733 A1 | 2/2013 |

OTHER PUBLICATIONS

Keynes, Andrew-Milton, "Customer Reviews -Samsung E2222 'Texto' Dual SIM Capable Sim Free Mobile Phone", Published on: Nov. 13, 2011, Available at: <http://www.amazon.co.uk/product-reviews/B005G3X6VQ>, 6 pages.

Delaney, Ian, "Nokia Asha 310 brings Easy Swap Dual SIM and Wi-Fi", Published on: Feb. 12, 2013, Available at: <http://conversations.nokia.com/2013/02/12/nokia-asha-310-brings-easy-swap-dual-sim-and-wi-fi/>,10 pages.

International Search Report and Written Opinion received for PCT Patent Application No. PCT/US2014/054452, Mail Date: Jan. 21, 2015, 13 Pages.

International Preliminary Report on Patentability Issued in PCT Application No. PCT/US2014/054452, Mail Date: Sep. 18, 2015, 7 Pages.

\* cited by examiner

DUMMY PHONE NUMBERS TO MANAGE STATES ON MOBILE PHONES

BACKGROUND

A subscriber identity module or subscriber identification module (SIM) is an integrated circuit that securely stores the international mobile subscriber identity (IMSI) and the related key used to identify and authenticate subscribers on mobile telephony devices (such as mobile phones and computers). Some telephony devices, such as mobile phones, can include multiple SIMs in a single device.

Peripheral devices (e.g., cars, headsets, etc.) may be used to interact with mobile phones through a wireless communication protocol, such as Bluetooth™, to initiate phone calls using the mobile phones. For instance, a Bluetooth™ peripheral supporting the "Hands-free Profile" can initiate a phone call through a coupled mobile phone by sending a dial string that includes a phone number to the mobile phone. If the mobile phone includes more than one SIM, the mobile phone has to select one of the SIMs to use to place the phone call. For example, a user might have a first SIM used for his/her work calls and a second SIM used for his/her personal calls. In some situations, the mobile phone may use the incorrect SIM to place a phone call.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A user is enabled to control states on a mobile phone through a peripheral device, such as a vehicle or headset. The mobile phone is coupled with the peripheral device by a communication link. Contacts stored by the mobile phone are copied to the peripheral device. The contacts include dummy phone numbers and corresponding contact names. Each dummy phone number is associated with a corresponding mobile phone state. A user can interact with the peripheral device to select a contact name of the contacts as if initiating a phone call with the corresponding dummy phone number to cause the corresponding mobile phone state to be activated at the mobile phone. Examples of mobile phone state activations/changes include activating an application in the mobile phone, or activating a particular SIM of multiple SIMs of the mobile phone.

In one method implementation in a mobile phone, a first dummy phone number is associated with a first mobile phone state, a first contact name is assigned to the first dummy phone number, a second dummy phone number is associated with a second mobile phone state, and a second contact name is assigned to the second dummy phone number. The mobile phone is communicatively coupled with a peripheral device by a communication link to copy at least the first and second dummy phone numbers and first and second contact names to the peripheral device. A user is enabled to interact with the peripheral device to select the first contact name or the second contact name as if initiating a phone call to cause the corresponding one of the first mobile phone state or the second mobile phone state to be activated.

For instance, a first communication may be received by the mobile phone from the peripheral device that indicates the first dummy phone number. The first communication may have been transmitted in response to the user interacting with the peripheral device to select the first contact name. The first mobile phone state is activated in response to the first communication. A second communication is received from the peripheral device that indicates the second dummy phone number. The second communication may have been transmitted in response to the user interacting with the peripheral device to select the second contact name. The second mobile phone state is activated in response to the second communication.

In one aspect, the first dummy phone number may be associated with an application. The user may be enabled to select the first contact name at the peripheral device to cause the application to be activated in the mobile phone.

In another aspect, the first dummy phone number may be associated with a first SIM of a plurality of SIMs of the mobile phone, and the second dummy phone number may be associated with a second SIM of the plurality of SIMs. The user may be enabled to interact with the peripheral device to select the first contact name or the second contact name as if initiating a phone call to cause the corresponding one of the first SIM or the second SIM to be enabled in the mobile phone (i.e., to be configured for use in making outgoing phone calls).

For instance, a first communication may be received from the peripheral device that indicates the first dummy phone number. The first communication may have been transmitted in response to the user interacting with the peripheral device to select the first contact name. The first SIM may be enabled to be an active SIM of the mobile phone in response to the first communication. A second communication may be received from the peripheral device that includes a first actual phone number contained in the contacts. The first actual phone number is called to initiate a first phone call using the first SIM.

Furthermore, a third communication may be received from the peripheral device that indicates the second dummy phone number. The third communication may have been transmitted in response to the user interacting with the peripheral device to select the second contact name. The second SIM may be enabled to be the active SIM of the mobile phone in response to the third communication. A fourth communication may be received from the peripheral device that includes a second actual phone number contained in the contacts. The second actual phone number is called to initiate a second phone call using the second SIM.

In an example telephony device apparatus implementation, a mobile phone includes a contacts manager, a communication module, and a state manager. The contacts manager is configured to enable a first dummy phone number to be associated with a first mobile phone state, a first contact name to be assigned to the first dummy phone number, a second dummy phone number to be associated with a second mobile phone state, and a second contact name to be assigned to the second dummy phone number. The communication module is configured to couple the mobile phone with a peripheral device by a communication link to copy at least the first and second dummy phone numbers and first and second contact names to the peripheral device. The state manager is configured to activate one of the first mobile phone state or the second mobile phone state in response to a user interacting with the peripheral device to select a corresponding one of the first contact name or the second contact.

A computer readable storage medium is also disclosed herein having computer program instructions stored therein that enable a processor to enable a user to interact with a peripheral device to cause a state activation on a mobile phone according to the embodiments described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use embodiments of the invention.

Figure 1:
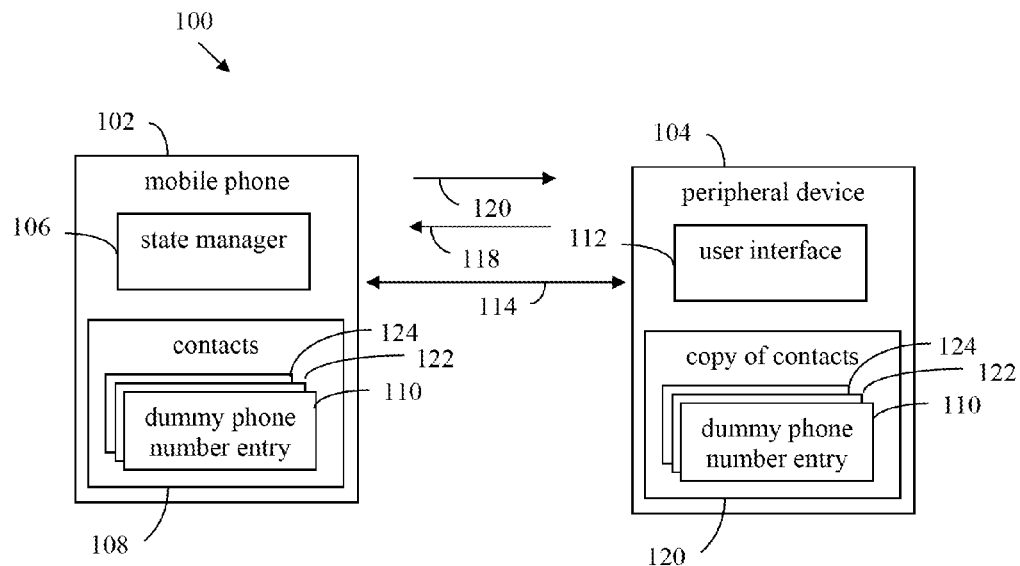
FIG. 1 shows a block diagram of a communication system where a mobile phone is linked to a peripheral device, and a user is enabled to activate states of the mobile phone by interacting with the peripheral device, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

A subscriber identity module or subscriber identification module (SIM) is an integrated circuit that securely stores the international mobile subscriber identity (IMSI) and the related key used to identify and authenticate subscribers on mobile telephony devices (such as mobile phones and computers). A SIM may be embedded in a removable card (a "SIM card"). The SIM card may be moved from one telephony device to another telephony device to enable the user that owns the SIM to change devices for making phone calls. Some telephony devices, such as mobile phones, can include multiple SIMs in a single device. The multiple SIMs may be implemented in separate integrated circuits (e.g., on same or separate cards) or in a common circuit or card.

Peripheral devices (e.g., cars, headsets, etc.) may be used to interact with mobile phones through a wireless communication protocol, such as Bluetooth™, to initiate phone calls using the mobile phones. For instance, a Bluetooth™ peripheral supporting the "Hands-free Profile" can initiate a phone call through a coupled mobile phone by sending a dial string that includes a phone number to the mobile phone. If the mobile phone includes more than one SIM, the mobile phone has to select one of the SIMs to use to place the phone call. For example, a user might have a first SIM used for his/her work calls and a second SIM used for his/her personal calls. In some situations, the mobile phone may select or use the incorrect SIM to place a phone call.

Embodiments enable users to select a desired SIM and/or activate other states at a mobile phone by interacting with a peripheral device of the mobile phone. This is enabled by the creation of "dummy" or "fake" phone numbers in contacts (e.g., phonebook entries) on the mobile phone. The dummy phone numbers allow the user, from the peripheral device (which may be a hands-free peripheral) to control which state(s) is/are activated at the mobile phone (e.g., which SIM is active, starting an application, configuring a mobile phone setting, etc.). The user selects a dummy phone number at the peripheral device as if making a phone call, and the state corresponding to the selected dummy phone number is activated at the mobile phone automatically. For instance, dummy phone numbers may be associated with multiple SIMs of a mobile phone, and a particular dummy phone number may be selected at the peripheral device to activate the corresponding SIM at the mobile phone. The activated SIM may be subsequently used to conduct phone calls at the mobile phone, until another SIM is activated at the mobile phone.

For example, with respect to a mobile phone having multiple SIMs, a unique dummy phone number may be assigned to each SIM (e.g. "5550001" for "SIM1", "5550002" for "SIM2"). For each SIM, a phonebook entry may be created with a friendly and descriptive name, and that entry may be mapped to the corresponding dummy phone number. For instance, if SIM1 is for the carrier AT&T, a friendly contact name such as "Use AT&T" (or other contact name, including the dummy phone number itself) may be chosen for SIM1. The user may be involved in the process of assigning the contacts name, an IT professional may assign the contacts name, or other person may assign the contacts name for the dummy phone number. A peripheral device, such as a Bluetooth™ peripheral (e.g., a car), may download the phonebook contents from the mobile phone, including the dummy phonebook entries. The user may take an action on the peripheral device (e.g., by tapping a LCD display of phonebook entries or using speech recognition of the peripheral device) to cause the peripheral device to issue a dial command to one of the dummy phone numbers. The mobile phone receives the dial command which causes the mobile phone to change state such that future phone calls will use the SIM corresponding to the selected dummy phone number. However, no actual phone call is made to the dummy phone number. Instead, the phone may return an error response to the dialing command for the dummy phone number or may in some other manner immediately terminate or not even initiate the "non"-call. The user may subsequently initiate a call to a real phone number from the peripheral device. The mobile phone may place the call using the SIM selected by the dummy phone number. The user may make additional calls using the same SIM as desired. If the user wishes to use a different SIM, the user can select the different SIM as described above.

These and further embodiments described herein may be implemented in a variety of environments. For instance, FIG. 1 shows a block diagram of a communication system 100 where a mobile phone 102 is linked to a peripheral device 104, and a user is enabled to activate states of mobile phone 102 by interacting with peripheral device 104, according to an example embodiment. As shown in FIG. 1, mobile phone 102 includes a state manager 106 and contacts 108, which includes one or more dummy phone number entries (e.g., dummy phone number entries 110, 122, and 124. Peripheral device 104 includes a user interface 112 and a copy of contacts 120, which includes at least one dummy phone number entry (e.g., dummy phone number entries 110, 122, and 124 copied from contacts 108). These features of communication system 100 are described as follows.

Mobile phone 102 may be any type of mobile telephony device, including a mobile computer or computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google Android™ operating system, a Palm® device, a RIM Blackberry® device, etc.), a wearable computing device that includes phone call functionality, or other type of mobile telephony device. Peripheral device 104 may be implemented in a peripheral device that is capable of communicatively linking (e.g., wirelessly) with mobile phone 102 to initiate phone calls with other entities using mobile phone 102. Examples of peripheral device 104 include a mobile phone headset (e.g., a Bluetooth™ earpiece or ear buds), a vehicle (e.g., a car, a truck, a boat, an aircraft, etc.), a wristwatch and/or other wearable computing device, a game console, a wireless speaker (e.g., a Jambox® or other wireless speaker distributed by Jawbone of San Francisco, Calif.) or stereo head unit (e.g., an aftermarket stereo), or another type of peripheral device.

Mobile phone 102 and peripheral device 104 are communicatively coupled by a communication link 114. Communication link 114 may be a PAN (personal area network) link such as a Bluetooth™ link or other type of communication link between a mobile phone and a peripheral device that enables the peripheral device to initiate phone calls by the mobile phone.

Mobile phone 102 and peripheral device 104 may be associated with a corresponding user that interacts with peripheral device 104 to initiate phone calls using mobile phone 102. As shown in FIG. 1, contacts 108 in mobile phone 102 includes one or more dummy phone number entries 110, 122, and 124. Each of dummy phone number entries 110, 122, and 124 includes a corresponding dummy phone number that is associated with a state of mobile phone 102 that is managed by state manager 106. When peripheral device 104 is communicatively linked with mobile phone 102 by communication link 114, contacts 108 of mobile phone 102 are copied to peripheral device 104 over communication link 114, to be stored as copy of contacts 120. Subsequently, a user of peripheral device 104 may interact with user interface 112 to select a dummy phone number of dummy phone number entries 110, 122, and 124 as if the user was initiating a phone call with the selected dummy phone number. The selected dummy phone number is transmitted from peripheral device 104 to mobile phone 102 over communication link 114 as a first communication 118. State manager 106 receives the dummy phone number transmitted in first communication 118, and is configured to activate the state associated with dummy phone number. For instance, state manager 106 may activate an application, may activate a particular SIM, may set a mobile phone setting, or may activate another type of state in mobile phone 102. In this manner, a user a can activate a state in mobile phone 102 using peripheral device 104, without having to touch or otherwise interact directly with mobile phone 102 ("hands-free" operation).

Figure 2:
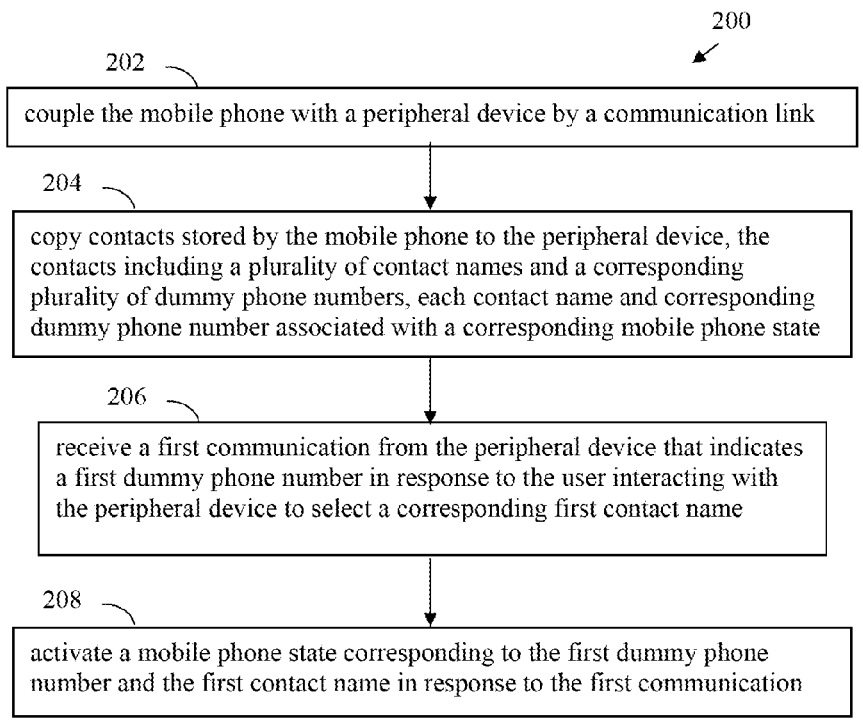
FIG. 2 shows a flowchart providing a process for enabling a user to activate states of a mobile phone by interacting with a peripheral device, according to an example embodiment.
Figure 3:
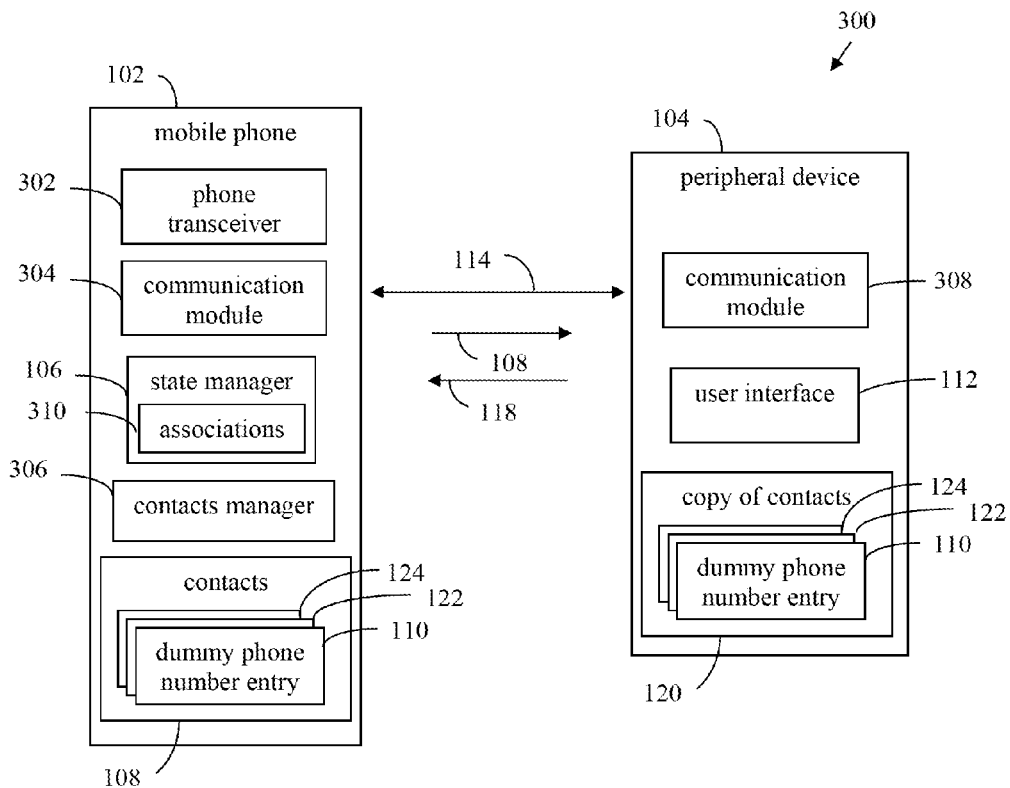
FIG. 3 shows a block diagram of a communication system where a mobile phone is linked to a peripheral device, and a user is enabled to activate states of the mobile phone by interacting with the peripheral device, according to another example embodiment.

Mobile phone 102 and peripheral device 104 may be configured and may operate in various ways to perform these functions. For instance, FIG. 2 shows a flowchart 200 providing a process for enabling a user to activate states of a mobile phone by interacting with a peripheral device, according to an example embodiment. Mobile phone 102 of FIG. 1 may operate according to flowchart 200, in an embodiment. For purposes of illustration, flowchart 200 of FIG. 2 is described with respect to FIG. 3. FIG. 3 shows a block diagram of a communication system 300 where mobile phone 102 is linked to peripheral device 104, and a user is enabled to activate states of mobile phone 102 by interacting with peripheral device 104, according to another example embodiment. Communication system 300 is an example of communication system 100 of FIG. 1. Mobile phone 102 of FIG. 3 is similar to mobile phone 102 of FIG. 1, including state manager 106 and contacts 108 (which includes dummy phone number entries 110, 122, 124), and with a phone transceiver 302, a communication module 304, and a contacts manager 306 additionally shown. Furthermore, peripheral device 104 of FIG. 3 is similar to peripheral device 104 of FIG. 1, including user interface 112 and copy of contacts 120, and with a communication module 308 additionally shown. Flowchart 200 and communication system 300 of FIG. 3 are described as follows. Further structural and operational embodiments will be apparent to persons skilled in the relevant art(s) based on the following description.

Flowchart 200 begins with step 202. In step 202, the mobile phone is coupled with a peripheral device by a communication link. In an embodiment, mobile phone 102 and peripheral device 104 are communicatively coupled (e.g., joined, paired, bonded, etc.) by the establishment of communication link 114 between them. For instance, as shown in FIG. 3, communication module 304 in mobile phone 102 and communication module 308 in peripheral device 104 may be configured to establish communication link 114. Communication modules 304 and 308 may each include a transceiver (e.g., a receiver and transmitter), an antenna, communication protocol logic, and/or further communication elements used to establish, send, and receive signals over communication link 114. Communication link 114 may be established according to any suitable protocol or communication standard, such as Bluetooth™ or other standard. For instance, with regard to Bluetooth™, PIN codes, secure simple pairing (SSP), or other acceptable pairing mechanism may be used. As such, communication modules 304 and 308 may be Bluetooth™ communication modules implementing Bluetooth™ protocol stacks, or may be configured to communicate according to one or more other communication standards or protocols described elsewhere herein or otherwise known.

For instance, in an example Bluetooth™ implementation where peripheral device 104 is a car, communication link 114 may be established according to a hands-free protocol, such as a HFP (hands-free profile) 1.5, 1.6, or other implementation on top of the Bluetooth 2.0 and/or Bluetooth 1.2 core specifications (or other Bluetooth™ specification). In such a case, mobile phone 102 may be considered to be the audio gateway, and peripheral device 104 may be considered to be the hands free device. In another example Bluetooth™ implementation where peripheral device 104 is a headset, communication link 114 may be established according to HFP and/or a headset profile (HSP). In other Bluetooth™ implementations, further types of Bluetooth™ profiles may be used for communication link 114 as would be appropriate for the particular situation, as would be known to persons skilled in the relevant art(s).

In step 204, contacts stored by the mobile phone are copied to the peripheral device, the contacts including a plurality of contact names and a corresponding plurality of dummy phone numbers, each contact name and corresponding dummy phone number associated with a corresponding mobile phone state. For example, as shown in FIG. 3, mobile phone 102 may include contacts 108, which may be referred to a phone book or other contacts list that stores phone numbers and optionally further information regarding persons a user of mobile phone 102 may call. For instance, as shown in FIG. 3, contacts 108 may include first-third dummy phone number entries 110, 122, and 124, as well as one or more real or actual phone numbers of persons. Contacts 108 stored in mobile phone 102 may be copied to peripheral device 104 over communication link 114, and stored in peripheral device 104 as copy of contacts 120. Therefore copy of contacts 120 may include one or more dummy phone number entries, such as first-third dummy phone number entries 110, 122, and 124, as well as one or more real or actual phone numbers. Mobile phone 102 and peripheral device 104 may each include memory or other storage in which contacts 108 and copy of contacts 120 are respectively stored in. Examples of suitable storage are described elsewhere herein.

In a Bluetooth™ example, the phone book access profile (PBAP) may be used by communication modules 304 and 308 to exchange phone book objects over communication link 114, such as transmitting of contacts 108 over communication link 114 to peripheral device 104 from mobile phone 102. In other embodiments, contacts 108 may be copied to peripheral device 104 by communication modules 304 and 308 in other ways, as would be known to persons skilled in the relevant art(s).

As described above, dummy phone number entries may be created that associate dummy phone numbers with mobile phone states. A user, such as a user of mobile phone 102 or other user (e.g., a developer, an IT professional, etc.) may create the associations by interacting directly with mobile phone 102 or may create the associations elsewhere, and the associations may be downloaded to mobile phone 102. In an embodiment, contacts 108 may be managed in mobile phone 102 by contacts manager 306. For instance, in an embodiment, contacts manager 306 may enable phone number entries to be added to, modified in, or deleted from contacts 108, including dummy phone number entries. Furthermore, contacts manager 108 may be configured to enable dummy phone numbers to be associated with mobile phone states, and for contact names to be assigned to dummy phone numbers. Contact manager 108 may perform these functions by enabling a user to interact with contacts (e.g., by providing a user interface), and/or by receiving phone number entries configured at other sources.

Figure 4:
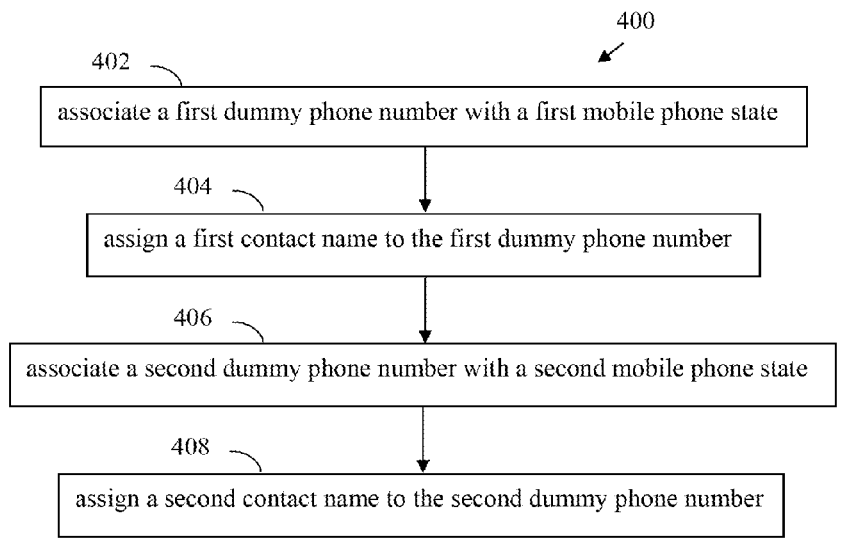
FIG. 4 shows a flowchart providing a process for associating dummy phone number entries with mobile phone states, according to an example embodiment.

FIG. 4 shows a flowchart 400 providing a process for associating dummy phone number entries with mobile phone states, according to an example embodiment. Flowchart 400 may be performed by contacts manager 306, such as by enabling a user of mobile phone 102 or by other user (e.g., a developer, an IT professional, etc.) to interact with contacts 108 (e.g., via a user interface), and/or by maintaining dummy phone number entries that were previously configured. Note that the steps of flowchart 400 may be performed in other orders than shown in FIG. 4, and not all steps in flowchart 400 need be performed in all embodiments. Flowchart 400 is described as follows.

In step 402, a first dummy phone number is associated with a first mobile phone state. In an embodiment, a first dummy phone number stored in contacts 108 may be associated with a first mobile phone state that is managed by state manager 106. The first dummy phone number may have any suitable numerical format (e.g., a 7 or 10 digit phone number, without or with area code). The first dummy phone number may be associated with any mobile phone state, such a SIM state (e.g., which SIM of multiple SIMs is active for the mobile phone), an application state (e.g., whether a particular application is active, an application setting, etc.), a mobile phone setting, or other mobile phone state. As shown in FIG. 3, state manager 106 may store associations 310 (e.g., in storage of mobile phone 102) that indicates associations between dummy phone numbers and mobile phone states (e.g., indicating what mobile phone state each dummy phone number is associated with).

In step 404, a first contact name is assigned to the first dummy phone number. In an embodiment, a first contact name may be assigned to a first dummy phone number in contacts 108. The contact name may be a textual/verbal set of one or more words/characters that a user may enter at peripheral device 104 (e.g., by touching and/or gesturing to a touch screen or other touch or gesture recognition device, speaking to a speech recognition engine, etc.). Thus, the contact name may include one or more words that a user is likely to remember in association with a particular mobile phone state (e.g., "Use AT&T", "Use Verizon", "Tell Me Weather", "Set Alarm", etc.) that may be activated by a dummy phone number.

Figure 5:
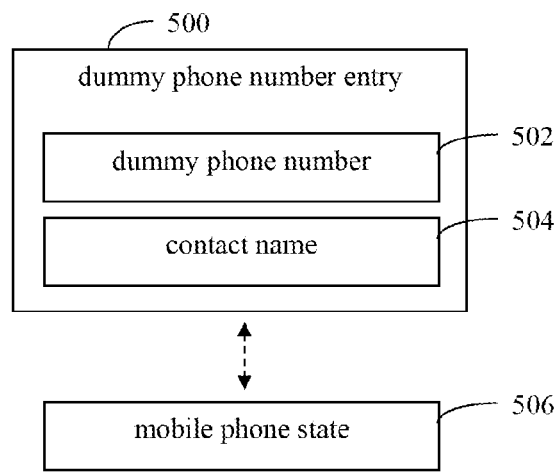
FIG. 5 shows a block diagram of a dummy phone number entry associated with a mobile phone state, according to an example embodiment.

FIG. 5 shows a block diagram of a dummy phone number entry 500 associated with a mobile phone state, according to an example embodiment. Dummy phone number entry 500 is an example of one of dummy phone number entries 110, 122, and 124 shown in FIGS. 1 and 3. As shown in FIG. 5, dummy phone number entry 500 includes a dummy phone number 502 (e.g., "4255552789") and an assigned contact name 504 (e.g., "Tell Me News"). Furthermore, as shown in FIG. 5, dummy phone number entry 500 is associated with a particular mobile phone state 506 (e.g., a state that enables a news application in mobile phone 102 to be activated). The association between dummy phone number entry 500 and mobile phone state 506 may be stored in associations 310 maintained by state manager 106 (FIG. 3).

Thus, steps 402 and 404 of flowchart 400 in FIG. 4 may be used to configure a particular dummy phone number and contact name to be used to activate a particular associated mobile phone state. Steps 402 and 404 may be repeated any number of times to configure further associations, such as in steps 406 and 408 described as follows.

In step 406, a second dummy phone number is associated with a second mobile phone state. Similar to step 402 described above, a second dummy phone number stored in contacts 108 may be associated with a second mobile phone state that is managed by state manger 106. The second dummy phone number may have any suitable phone number format, and the second dummy phone number may be associated with any mobile phone state.

In step 408, a second contact name is assigned to the second dummy phone number. Similar to step 404 described above, a second contact name may be assigned to a second dummy phone number in contacts 108. The second contact name may be a textual/verbal set of one or more words/characters that a user may enter at peripheral device 104. Thus, the second contact name may include one or more words that a user is likely to remember in association with a particular mobile phone state that may be activated by a dummy phone number, as described above.

Referring back to flowchart 200 in FIG. 2, in step 206, a first communication is received from the peripheral device that indicates a first dummy phone number in response to the user interacting with the peripheral device to select a corresponding first contact name. In an embodiment, a user may interact with a user interface 112 generated and/or provided by peripheral device 104 to select a contact name associated with a dummy phone number. For instance, the user may push one or more buttons (e.g., a physical button, a touch screen button, etc.), may speak to a speech recognition system, or may otherwise interact with user interface 112 to select a contact name of a dummy phone number entry stored in copy of contacts 120. The dummy phone number associated with the selected contact name in copy of contacts 120 may be transmitted to communication module 304 in mobile phone 102 from communication module 308 in peripheral device 104 over communication link 114 in first communication 118.

In one example, the user may select the contact name "Use AT&T" of dummy phone number entry 110, which may be associated with dummy phone number "5550001" in copy of contacts 120. In response to the selection of "Use AT&T", communication module 308 may transmit dummy phone number "5550001", which is received by communication module 304 at mobile phone 304 in first communication 118.

Note that first communication 118 may contain an indication of the dummy phone number in any manner. For instance, first communication 118 may be transmitted according in the command format of "ATD5550001", where "AT" is a standard prefix and "D" is for "dial" according to HFP, or may be transmitted in another format.

Referring back to flowchart 200 in FIG. 2, in step 208, a mobile phone state corresponding to the first dummy phone number and the first contact name is activated in response to the first communication. As described above, in an embodiment, state manager 106 may receive the dummy phone number transmitted in first communication 118. State manager 106 is configured to activate the state associated with dummy phone number. For instance, state manager 106 may access associations 310, which may be a table, an array, or other data structure that maps dummy phone numbers to mobile phone states.

Figure 6:
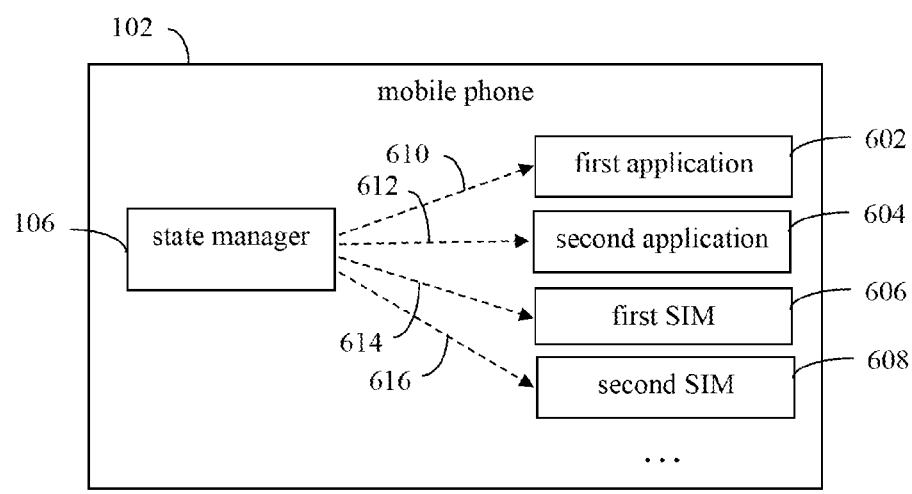
FIG. 6 shows a block diagram of a mobile phone that contains a state manager configured to activate mobile phone states, according to an example embodiment.

State manager 106 may activate an application, may activate a particular SIM, may set a mobile phone setting, or may activate another type of state in mobile phone 102. For instance, FIG. 6 shows a block diagram of mobile phone 102 containing state manager 106, which is configured to activate mobile phone states, according to an example embodiment. As shown in FIG. 6, depending on a particular dummy phone number indicated in first communication 118 (FIG. 3), state manager 106 may generate a corresponding one or more of first-fourth activation instructions 610, 612, 614, and 616. For instance, each of first-fourth activation instructions 610, 612, 614, and 616 may correspond to a respective dummy phone number. First activation instruction 610 may be configured to activate a first application 602 (e.g., open a news application, a weather application, a mapping application, etc.), second activation instruction 612 may be configured to activate a second application 604, third activation instruction 614 may be configured to activate a first SIM 606 (and disable any other SIM that was active), and fourth activation instruction 616 may be configured to activate a second SIM 608. Additional and/or alternative activation instructions may be generated by state manager 106 to activate particular mobile phone states based on particular dummy phone numbers.

In this manner, a user a can activate a state in mobile phone 102 using peripheral device 104, without having to touch ("hands-free") or otherwise interact directly with mobile phone 102. Exemplary embodiments of flowchart 200 are described as follows with respect to FIGS. 7 and 8 for purposes of illustration.

Figure 7:
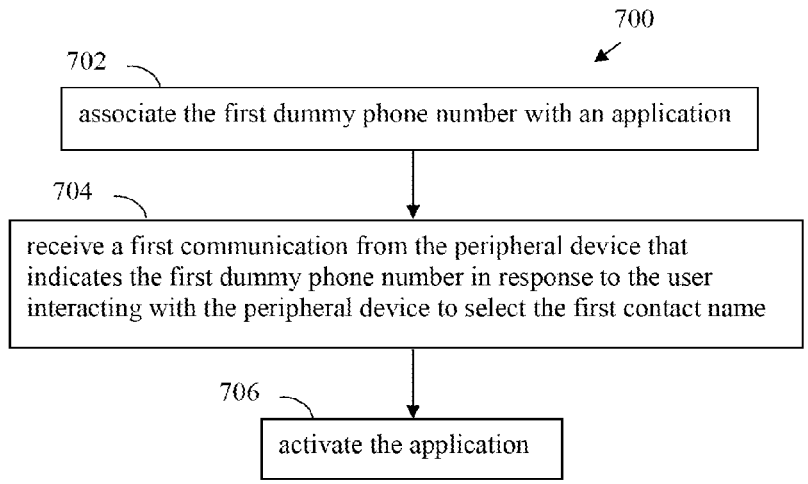
FIG. 7 shows a flowchart providing a process for enabling a mobile phone application to be activated by a user selecting a dummy phone number at a peripheral device, according to an example embodiment.

For instance, FIG. 7 shows a flowchart 700 providing a process for enabling a mobile phone application to be activated by a user selecting a dummy phone number at a peripheral device, according to an example embodiment. Mobile phone 102 of FIGS. 1, 3, and 6 may operate according to flowchart 700, in an embodiment. Flowchart 700 is described as follows. Further structural and operational embodiments will be apparent to persons skilled in the relevant art(s) based on the following description.

Flowchart 700 begins with step 702. Note that prior to step 702, step 202 in FIG. 2 may have already been performed. In step 702, the first dummy phone number is associated with an application. For instance, in an embodiment, a dummy phone number entry, such as dummy phone number entry 122, may have been created that stores a dummy phone number (e.g., "5551212") and contact name (e.g., "Activate First Application"), and the dummy phone number may be associated a state of a mobile phone application, such as a state of first application 602 shown in FIG. 6. Furthermore, an indication of the association between the dummy phone number and application state may be stored in associations 310 (FIG. 3).

Step 704 in FIG. 7 may be performed as part of step 206 of flowchart 200 in FIG. 2, and after step 204. In step 704, a first communication is received from the peripheral device that indicates the first dummy phone number in response to the user interacting with the peripheral device to select the first contact name. In an embodiment, a user may interact with user interface 112 of peripheral device 104 to select the contact name in copy of contacts 120 (e.g., "Activate First Application") assigned to the dummy phone number (e.g., "5551212") associated with the application. In response, the dummy phone number may be transmitted from communication module 308 in peripheral device 104 over communication link 114 to communication module 304 of mobile phone 102 in first communication 118.

In step 706, the application is activated. As described above, state manager 106 may receive the dummy phone number (e.g., "5551212") transmitted in first communication 118. State manager 106 may access associations 310 to determine that first application 602 (FIG. 6) is associated with the received dummy phone number, and may activate first application 602 with activation instruction 610.

In this manner, an application in or otherwise accessible by mobile phone 102 may be activated by a user of peripheral device 104, without directly interacting with mobile phone 102.

Figure 8:
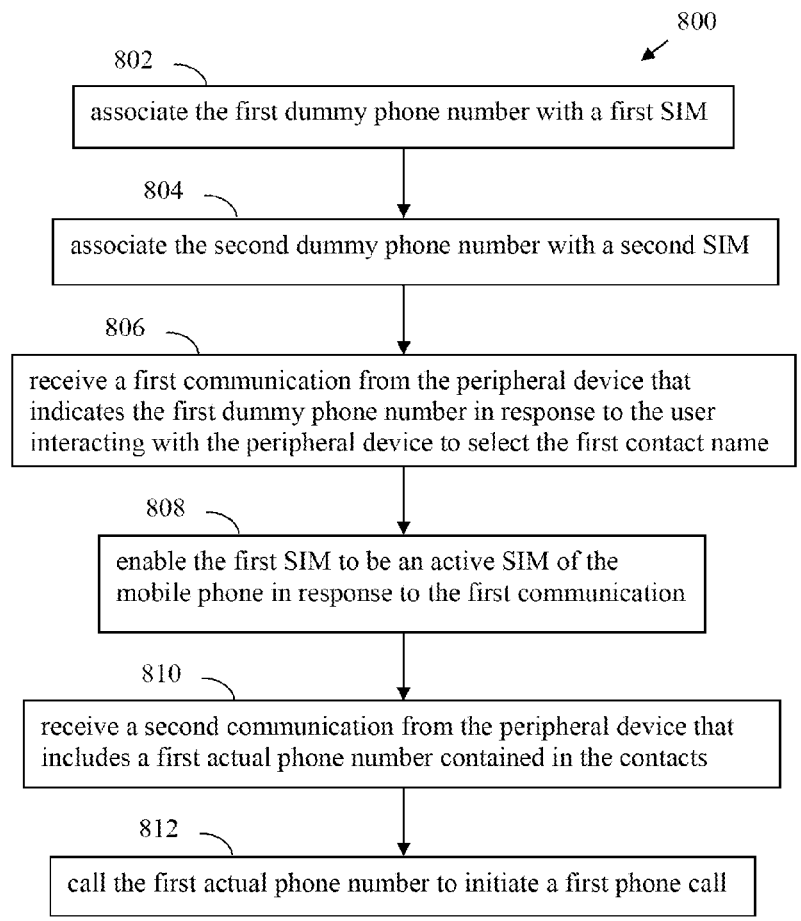
FIG. 8 shows a flowchart providing a process for selecting a SIM at a mobile phone to be used to make one or more phone calls, the SIM selected by a user selecting a dummy phone number at a peripheral device, according to an example embodiment.

In another example, FIG. 8 shows a flowchart 800 providing a process for selecting a mobile phone SIM to be used to make one or more phone calls, the SIM selected by a user selecting a dummy phone number at a peripheral device, according to an example embodiment. Mobile phone 102 of FIGS. 1, 3, and 6 may operate according to flowchart 800, in an embodiment. Flowchart 800 is described as follows. Further structural and operational embodiments will be apparent to persons skilled in the relevant art(s) based on the following description.

Flowchart 800 begins with step 802. Note that prior to step 802, step 202 in FIG. 2 may have already been performed. In step 802, the first dummy phone number is associated with a first SIM. For instance, in an embodiment, a dummy phone number entry, such as dummy phone number entry 110, may have been created that stores a dummy phone number (e.g., "5550001") and contact name (e.g., "Use AT&T"), and the dummy phone number may be associated with a first SIM state, such as a state of first SIM 606 shown in FIG. 6. Furthermore, an indication of the association between the dummy phone number and first SIM state may be stored in associations 310 (FIG. 3).

In step 804, the second dummy phone number is associated with a second SIM. In an embodiment, another dummy phone number entry, such as dummy phone number entry 110, may have been created that stores a dummy phone number (e.g., "5550002") and contact name (e.g., "Use Verizon"), and the dummy phone number may be associated with a second SIM state, such as a state of second SIM 608 shown in FIG. 6. Furthermore, an indication of the association between the dummy phone number and second SIM state may be stored in associations 310 (FIG. 3).

Step 806 in FIG. 8 may be performed as part of step 206 of flowchart 200 in FIG. 2, and after step 204. In step 806, a first communication is received from the peripheral device that indicates the first dummy phone number in response to the user interacting with the peripheral device to select the first contact name. In an embodiment, a user may interact with user interface 112 of peripheral device 104 to select the contact name in copy of contacts 120 (e.g., "Use AT&T") assigned to the first dummy phone number (e.g., "5550001") associated with first SIM 606. In response, the first dummy phone number may be transmitted from communication module 308 in peripheral device 104 over communication link 114 to communication module 304 of mobile phone 102 in first communication 118.

In step 808, the first SIM is enabled to be an active SIM of the mobile phone in response to the first communication. As described above, state manager 106 may receive the dummy phone number (e.g., "5550001") transmitted in first communication 118. State manager 106 may access associations 310 to determine that first SIM 606 (FIG. 6) is associated with the received dummy phone number, and may activate first SIM 606 with activation instruction 614. Note that activation instruction 614 may be a state change instruction if second SIM 608 (or other SIM) was active in mobile phone 102, so that second SIM 608 is disabled and first SIM 606 is enabled, in the case where only a single SIM may be active in mobile phone 102 at any one time.

In step 810, a second communication is received from the peripheral device that includes a first actual phone number contained in the contacts. In an embodiment, a user may interact with user interface 112 of peripheral device 104 to select a contact name in copy of contacts 120 (e.g., "Joe Smith") assigned to a real or actual phone number (e.g., "4253332756") that the user wants to call using mobile phone 102 and first SIM 606. In response, the actual phone number may be transmitted from communication module 308 in peripheral device 104 over communication link 114 to communication module 304 of mobile phone 102 in another communication signal.

In step 812, the first actual phone number is called to initiate a first phone call. In an embodiment, phone transceiver 302 of mobile phone 102 may receive the actual phone number (e.g., "4253332756") transmitted over communication link 114 from peripheral device 104. Phone transceiver 302 may initiate a phone call using the actual phone number, so that the user of mobile phone 102 and peripheral device 104 may have a phone conversation with one or more persons at a second phone associated with the actual phone number.

Phone transceiver 302 includes a transceiver (e.g., a receiver and transmitter), an antenna, communication protocol logic, and/or further communication elements used to establish, transmit, and receive phone signals (e.g., cell phone signals). Phone transceiver 302 may be configured to enable phone calls according to any suitable communication standard or technology, such as GSM, 3G, 4G, 5G, etc.

In this manner, a particular SIM of multiple SIMs contained by mobile phone 102 may be activated by a user of peripheral device 104, without directly interacting with mobile phone 102. Furthermore, in a similar manner to activating a first SIM as described with respect to flowchart 800, a second SIM (or other SIM) of mobile phone 102 may be activated. For instance, to activate second SIM 608 (FIG. 6), step 806 may be performed a second time in response to the user selecting the contact name assigned to the second dummy phone number (e.g., "Use Verizon" assigned to "5550002"). In step 808, second SIM 608 may be enabled, and in steps 810 and 812, a subsequent actual phone call may be conducted using second SIM 608.

Figure 9:
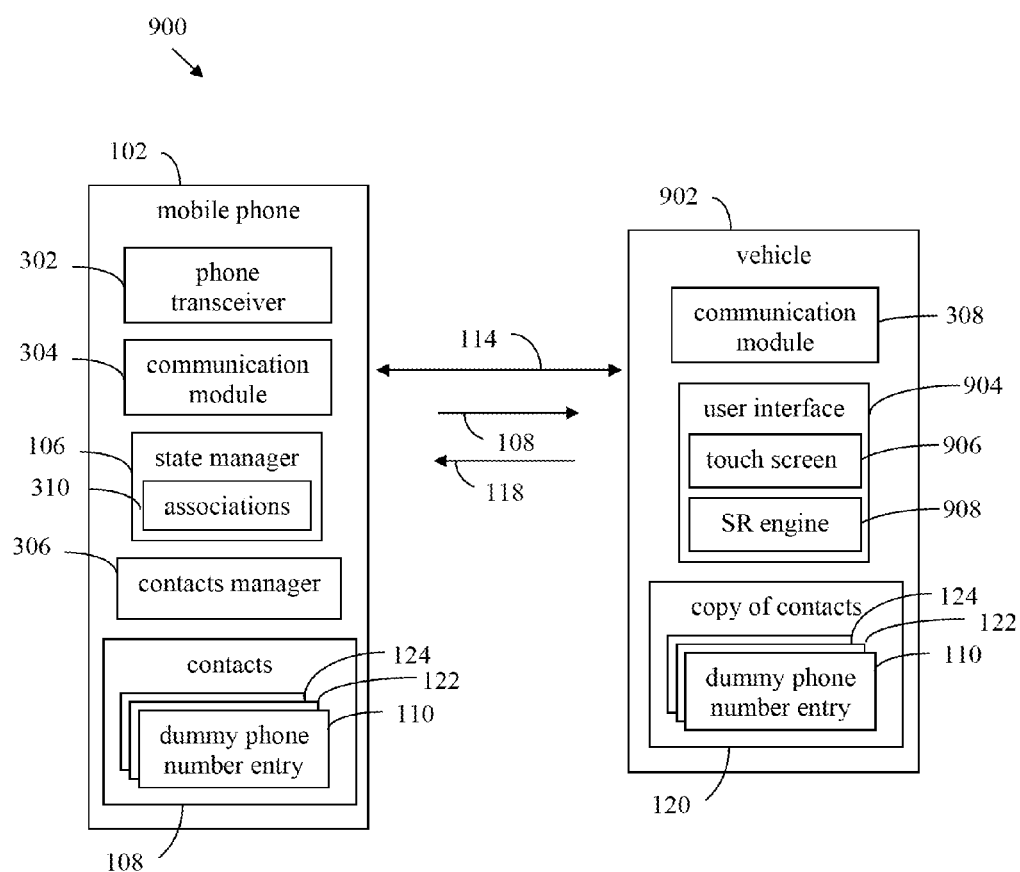
FIG. 9 shows a block diagram of a communication system where a mobile phone is linked to a vehicle that is a peripheral device, and a user is enabled to activate states of the mobile phone by interacting with a user interface at the vehicle, according to another example embodiment.

As described above, peripheral device 104 may be implemented in a variety of types of peripheral devices capable of communicatively linking (e.g., wirelessly) with mobile phone 102 to initiate phone calls using mobile phone 102, such a mobile phone headset, a vehicle, a watch, a game console, or another type of peripheral device. FIG. 9 shows a block diagram of a communication system 900 where mobile phone 102 is linked to a vehicle 902, according to another example embodiment. Vehicle 902 is an example of peripheral device 104. A user is enabled to activate states of mobile phone 102 by interacting with a user interface 904 of vehicle 902. For instance, in an embodiment, user interface 904 may include a touch screen 906, a speech recognition (SR) engine 908, and/or other user interface element that may be interacted with by a user to select contact names of phone numbers. For example, touch screen 906 may include an LCD (liquid crystal display) screen, or other type of touch sensitive display screen, where a user can select a phone number. SR engine 908 may include any suitable speech recognition engine that can enable to select a phone number using voice.

D. Example Mobile Phone and Peripheral Device Embodiments

State manager 106, user interface 112, phone transceiver 302, communication module 304, contacts manager 306, communication module 308, first application 602, second application 604, user interface 904, SR engine 908, flowchart 200, flowchart 400, flowchart 700, and flowchart 800 may be implemented in hardware, or hardware combined with software and/or firmware. For example, state manager 106, user interface 112, phone transceiver 302, communication module 304, contacts manager 306, communication module 308, first application 602, second application 604, user interface 904, SR engine 908, flowchart 200, flowchart 400, flowchart 700, and/or flowchart 800 may be implemented as computer program code/instructions configured to be executed in one or more processors and stored in a computer readable storage medium. Additionally or alternatively, state manager 106, user interface 112, phone transceiver 302, communication module 304, contacts manager 306, communication module 308, first application 602, second application 604, user interface 904, SR engine 908, flowchart 200, flowchart 400, flowchart 700, and/or flowchart 800 may be implemented as hardware logic/electrical circuitry.

For instance, in an embodiment, one or more of state manager 106, user interface 112, phone transceiver 302, communication module 304, contacts manager 306, first application 602, second application 604, flowchart 200, flowchart 400, flowchart 700, and/or flowchart 800 may be implemented together in a system-on-chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits and/or embedded firmware to perform its functions.

Figure 10:
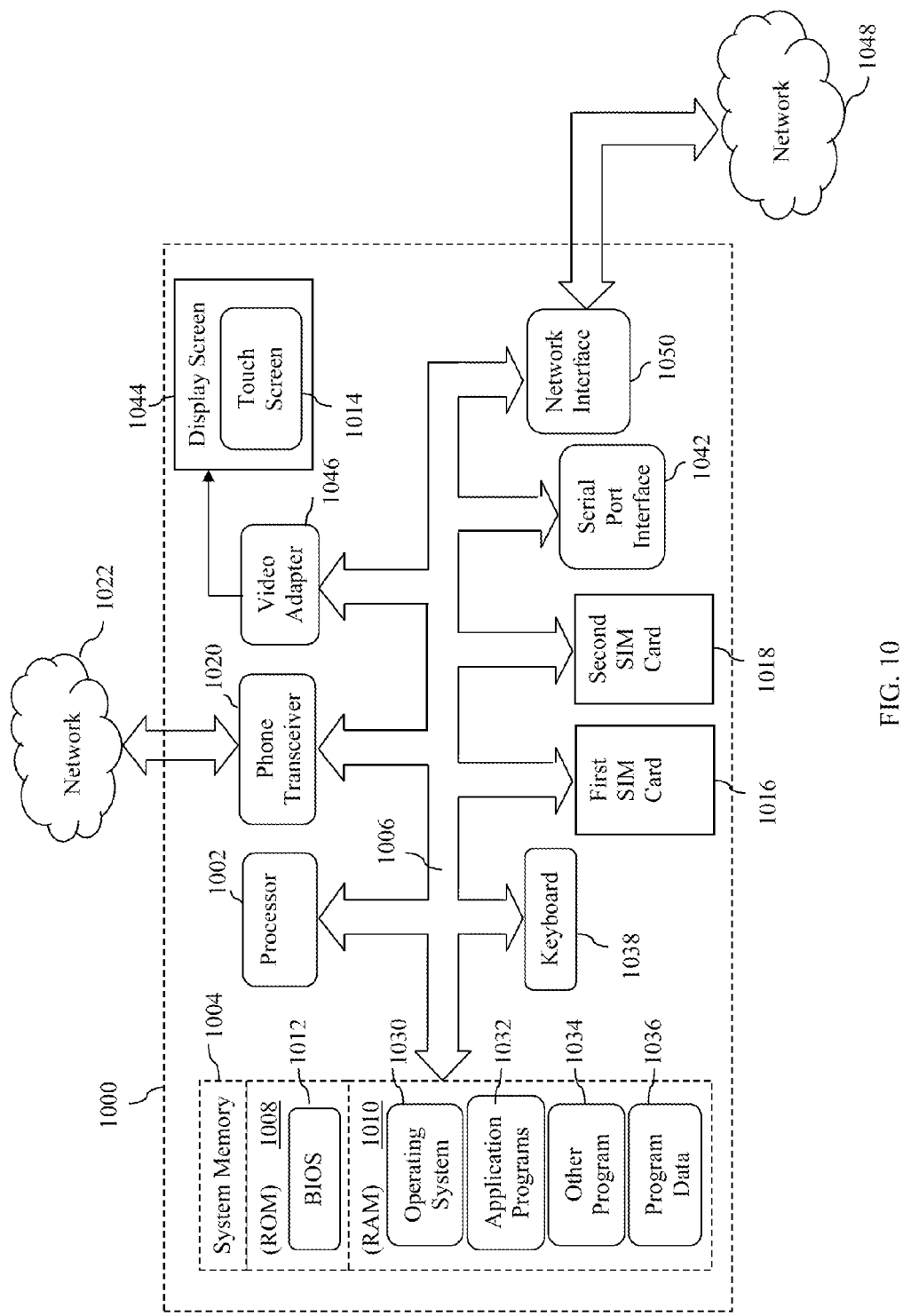
FIG. 10 shows a block diagram of an example telephony device that may be used to implement embodiments of the present invention.

FIG. 10 depicts an exemplary implementation of a mobile telephony device 1000 in which embodiments of the present invention may be implemented. For example, mobile phone 102 may be implemented in one or more devices similar to mobile telephony device 1000, and may include one or more features of mobile telephony device 1000 and/or alternative features. The description of mobile telephony device 1000 provided herein is provided for purposes of illustration, and is not intended to be limiting. Embodiments of the present invention may be implemented in further types devices, as would be known to persons skilled in the relevant art(s).

As shown in FIG. 10, mobile telephony device 1000 includes one or more processors 1002, a system memory 1004, and a bus 1006 that couples various system components including system memory 1004 to processor 1002. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

A number of program modules may be stored in the ROM or RAM. These programs include an operating system 1030, one or more application programs 1032, other program modules 1034, and program data 1036. Application programs 1032 or program modules 1034 may include, for example, computer program logic (e.g., computer program code or instructions) for implementing state manager 106, user interface 112, phone transceiver 302, communication module 304, contacts manager 306, communication module 308, first application 602, second application 604, user interface 904, SR engine 908, flowchart 200, flowchart 400, flowchart 700, and/or flowchart 800 (including any step of flowcharts 200, 400, 700, and 800), and/or further embodiments described herein.

Mobile telephony device 1000 may further include a phone transceiver 1020, a keyboard, a serial port interface 1042, a display screen 1044, a video adaptor 1046, and a network interface 1050. Phone transceiver 1020 may wirelessly initiate and conduct a phone call between a user of mobile telephony device 1000 and a user at another telephony device over a network 1022. Network 1022 includes one or more communication networks over which phone calls may be conducted, such as a cellular network, an IP network (e.g., the Internet), a plain old telephone service (POTS) network, etc. Phone transceiver 1020 includes a transceiver (e.g., a receiver and transmitter), an antenna, communication protocol logic, and/or further communication elements used to establish, transmit, and receive phone signals (e.g., cell phone signals). Phone transceiver 1020 may be configured to enable phone calls (and optionally transmit data) according to any suitable communication standard or technology, such as GSM, 3G, 4G, 5G, etc.

Mobile telephony device 1000 may include one or more SIM (subscriber identity module) slots that receive corresponding SIM cards, such as first and second SIM slots that receive first SIM card 1016 and second SIM card 1018 respectively. SIM cards 1016 and 1018 each enable phone calls to be made using phone transceiver 1020. SIM cards 1016 and 1018 each include an integrated circuit that securely stores the international mobile subscriber identity (IMSI) and the related key used to identify and authenticate subscribers on mobile telephony device 1000.

A display screen 1044 may be connected to bus 1006 via an interface, such as a video adapter 1046. Display screen 1044 may be external to, or incorporated in mobile telephony device 1000. In addition to display screen 1044, mobile telephony device 1000 may include other peripheral output devices (not shown) such as speakers. Display screen 1044 may include touch screen 1014 that can be interacted with by touch and/or gestures to enable a user to control and/or provide input to mobile telephony device 1000 (e.g., by providing a virtual keyboard, etc.).

A user may enter commands and information into mobile telephony device 1000 through additional input devices such as keyboard 1038. Keyboard 1038 may include one or more physical buttons on a housing of mobile telephony device 1000, and in some cases may include a partial or full alphanumeric keyboard. Other input devices (not shown) may include a microphone, a touch screen 1014, a thumb wheel, a touch pad, a voice recognition system and/or speech recognition system to receive voice input, a gesture recognition system to receive gesture input, or the like. These and other input devices are often connected to processor 1002 through bus 1006 and/or other signal interface. These and/or other input devices may be integrated in a housing of mobile telephony device 1000.

Mobile telephony device 1000 is connected to one or more data communication networks, such as a network 1048, through one or more adaptor or network interfaces 1050, through serial port interface 1042, or through other interface, wired or wireless, for establishing communications over a network. Examples of communication networks that network interface 1048 may connect with and enable communications over include a personal area network (PAN) such as a Bluetooth™ network, a wireless local area network (WLAN) (e.g., an IEEE 802.11 standard WLAN), etc. Network 1048 may be any type of communication network, including a local area network (LAN), a wide area network (WAN), a PAN, or a combination of communication networks, such as the Internet.

As used herein, the terms "computer program medium," "computer-readable medium," and "computer-readable storage medium" are used to generally refer to physical storage media such as RAM 1010, ROM 1008, any hard disk associated with a hard disk drive of mobile telephony device 1000 (when present), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1032 and other program modules 1034) may be stored on RAM 1010, ROM 1008, or other storage device of mobile telephony device 1000. Such computer programs may also be received via network interface 1050, serial port interface 1042, or any other interface type. Such computer programs, when executed or loaded by an application, enable mobile telephony device 1000 to implement features of embodiments of the present invention discussed herein. Accordingly, such computer programs represent controllers of the mobile telephony device 1000.

The invention is also directed to computer program products comprising computer code or instructions stored on any computer useable storage medium. Such computer code, when executed in one or more data processing devices, causes a data processing device(s) to operate as described herein. Embodiments of the present invention may employ any computer-useable or computer-readable storage medium, known now or in the future. Examples of computer-readable storage mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a mobile phone, comprising:
    associating a first dummy phone number, which is not an actual phone number assigned to a person in a contacts list in the mobile phone, with a first mobile phone state;
    assigning a first contact name to the first dummy phone number;
    coupling the mobile phone with a peripheral device by a communication link to copy at least the first dummy phone number and the first contact name to the peripheral device; and
    activating the first mobile phone state in response to receiving an instruction from the peripheral device to initiate a call to the first dummy phone number without placing an actual phone call to the first dummy phone number.

2. The method of claim 1, further comprising:
    associating a second dummy phone number with a second mobile phone state; and
    assigning a second contact name to the second dummy phone number;
    said activating the first mobile phone state comprising:
        receiving a first communication from the peripheral device that indicates the first dummy phone number in response to a user interacting with the peripheral device to select the first contact name, and
        activating the first mobile phone state in response to the first communication; and
    the method further comprising:
        receiving a second communication from the peripheral device that indicates the second dummy phone number in response to the user interacting with the peripheral device to select the second contact name, and
        activating the second mobile phone state in response to the second communication.

3. The method of claim 1, wherein said associating a first dummy phone number with a first mobile phone state comprises:
    associating the first dummy phone number with an application; and
    said activating comprising:
        activating the application in the mobile phone in response to a user selecting the first contact name at the peripheral device to initiate a call to the first dummy phone number.

4. The method of claim 1, further comprising:
- associating a second dummy phone number with a second mobile phone state;
- assigning a second contact name to the second dummy phone number;
- said associating a first dummy phone number with a first mobile phone state comprises:
  - associating the first dummy phone number with a first SIM (subscriber identity module) of a plurality of SIMs; and
- said associating a second dummy phone number with a second mobile phone state comprises:
  - associating the second dummy phone number with a second SIM of the plurality of SIMs; and
- said activating comprising:
  - activating the first SIM or the second SIM in the mobile phone in response to a user interacting with the peripheral device to respectively select the first contact name or the second contact name as if initiating a phone call.

5. The method of claim 4, wherein said activating the first SIM or the second SIM comprises:
- receiving a first communication from the peripheral device that indicates the first dummy phone number in response to the user interacting with the peripheral device to select the first contact name;
- enabling the first SIM to be an active SIM of the mobile phone in response to the first communication;
- receiving a second communication from the peripheral device that includes a first actual phone number contained in the contacts; and
- calling the first actual phone number to initiate a first phone call using the first SIM.

6. The method of claim 5, wherein said activating the first SIM or the second SIM further comprises:
- receiving a third communication from the peripheral device that indicates the second dummy phone number in response to the user interacting with the peripheral device to select the second contact name;
- enabling the second SIM to be the active SIM of the mobile phone in response to the third communication;
- receiving a fourth communication from the peripheral device that includes a second actual phone number contained in the contacts; and
- calling the second actual phone number to initiate a second phone call using the second SIM.

7. The method of claim 1, wherein the peripheral device is a vehicle, wherein said coupling comprises:
- coupling the mobile phone with a communication module of the vehicle by the communication link.

8. A mobile phone, comprising:
- a contacts manager configured to enable a first dummy phone number, which is not an actual phone number assigned to a person in a contacts list in the mobile phone, to be associated with a first mobile phone state, a first contact name to be assigned to the first dummy phone number;
- a communication module configured to couple the mobile phone with a peripheral device by a communication link to copy at least the first dummy phone number and the first contact name to the peripheral device and to copy one or more actual phone numbers to the peripheral device; and
- a state manager configured to activate the first mobile phone state in response to receiving an instruction from the peripheral device to initiate a call to the first dummy phone number without placing an actual phone call to the first dummy number.

9. The mobile phone of claim 8, wherein the contacts manager is configured to enable a second dummy phone number to be associated with a second mobile phone state, and a second contact name to be assigned to the second dummy phone number;
- the state manager is configured to activate the first mobile phone state in response to a first communication received by the communication module from the peripheral device that indicates the first dummy phone number, the first communication transmitted in response to the user interacting with the peripheral device to select the first contact name; and
- the state manager is configured to activate the second mobile phone state in response to a second communication received by the communication module from the peripheral device that indicates the second dummy phone number, the second communication transmitted in response to the user interacting with the peripheral device to select the second contact name.

10. The mobile phone of claim 8, wherein the first dummy phone number is associated with an application contained by the mobile phone;
- the state manager configured to activate the application in response to the user selecting the first contact name at the peripheral device.

11. The mobile phone of claim 8, further comprising:
- a phone transceiver configured to conduct phone calls in association with a plurality of SIMs (subscriber identity modules);
- the contacts manager is configured to enable a second dummy phone number to be associated with a second mobile phone state, and a second contact name to be assigned to the second dummy phone number;
- the first dummy phone number is associated with a first SIM of the plurality of SIMs;
- the second dummy phone number is associated with a second SIM of the plurality of SIMs; and
- the state manager is configured to cause the corresponding one of the first SIM or the second SIM to be enabled in the mobile phone in response to the user interacting with the peripheral device to select the first contact name or the second contact name as if initiating a phone call.

12. The mobile phone of claim 11, wherein the state manager is configured to enable the first SIM to be an active SIM of the mobile phone in response to a first communication received from the peripheral device that indicates the first dummy phone number, the first communication transmitted in response to the user interacting with the peripheral device to select the first contact name;
- the communication module receives a second communication from the peripheral device that includes a first actual phone number contained in the contacts; and
- the phone transceiver initiates a phone call with the first actual phone number using the first SIM.

13. The mobile phone of claim 12, wherein the state manager is configured to enable the second SIM to be the active SIM of the mobile phone in response to a third communication received from the peripheral device that indicates the second dummy phone number, the second communication transmitted in response to the user interacting with the peripheral device to select the second contact name;

the communication module receives a fourth communication from the peripheral device that includes a second actual phone number contained in the contacts; and the phone transceiver initiates a second phone call with the second actual phone number using the second SIM.

14. The mobile phone of claim 8, wherein the peripheral device is a vehicle, the communication module of the mobile phone configured to couple with a communication module of the vehicle by the communication link.

15. A computer readable storage medium having computer program instructions stored in the computer readable storage medium that enable a processor to perform a method in a mobile phone, the method comprising:

coupling the mobile phone with a peripheral device by a communication link;

copying contacts stored by the mobile phone to the peripheral device, the contacts including a first contact name and a corresponding first dummy phone number, which is not an actual phone number assigned to a person in a contacts list in the mobile phone, the first contact name and corresponding first dummy phone number associated with a mobile phone state; and activating the mobile phone state in response to receiving an instruction from the peripheral device to initiate a call to the first dummy phone number without placing an actual phone call to the first dummy phone number.

16. The computer readable storage medium of claim 15, wherein the contacts includes a plurality of contact names and a corresponding plurality of dummy phone numbers, each contact name and corresponding dummy phone number associated with a corresponding mobile phone state, said activating the mobile phone state comprising:

receiving a first communication from the peripheral device that indicates the first dummy phone number in response to the user interacting with the peripheral device to select the corresponding first contact name, and activating the mobile phone state corresponding to the first dummy phone number and the first contact name in response to the first communication;

the method further comprising:

receiving a second communication from the peripheral device that indicates a second dummy phone number in response to the user interacting with the peripheral device to select a corresponding second contact name; and activating a mobile phone state corresponding to the second dummy phone number and the second contact name in response to the second communication.

17. The computer readable storage medium of claim 16, wherein said activating a mobile phone state corresponding to the first dummy phone number and the first contact name in response to the first communication comprises:

activating an application contained in the mobile phone.

18. The computer readable storage medium of claim 16, wherein said activating the mobile phone state corresponding to the first dummy phone number and the first contact name in response to the first communication comprises:

activating a first SIM (subscriber identity module) of a plurality of SIMs; and said activating a mobile phone state corresponding to the second dummy phone number and the second contact name in response to the second communication comprises:

activating a second SIM of the plurality of SIMs.

19. The computer readable storage medium of claim 18, wherein the method further comprises:

receiving a third communication from the peripheral device that includes a first actual phone number contained in the contacts; and calling the first actual phone number to initiate a first phone call using the second SIM.

20. The computer readable storage medium of claim 15, wherein the peripheral device is a vehicle, wherein said coupling comprises:

coupling the mobile phone with a communication module of the vehicle by the communication link.

\* \* \* \* \*